(12) United States Patent
Smalls

(10) Patent No.: US 10,448,783 B2
(45) Date of Patent: Oct. 22, 2019

(54) CHAFER SKIRT

(71) Applicant: W. Dexter Smalls, Stone Mountain, GA (US)

(72) Inventor: W. Dexter Smalls, Stone Mountain, GA (US)

(*) Notice: Subject to any disclaimer, the term of this patent is extended or adjusted under 35 U.S.C. 154(b) by 0 days.

(21) Appl. No.: 15/589,442

(22) Filed: May 8, 2017

(65) Prior Publication Data

US 2019/0191924 A1 Jun. 27, 2019

(51) Int. Cl.
*A47J 36/00* (2006.01)
*A47J 36/24* (2006.01)

(52) U.S. Cl.
CPC .................... *A47J 36/24* (2013.01)

(58) Field of Classification Search
CPC ....... A47G 21/145; A47J 47/16; A47J 43/287; A47F 3/46
USPC ............... 248/317, 323, 339, 340; 126/246
See application file for complete search history.

(56) References Cited

U.S. PATENT DOCUMENTS

| | | | | |
|---|---|---|---|---|
| 9,668,617 B1* | 6/2017 | Barnes | ................ | A47J 43/287 |
| 2005/0076795 A1* | 4/2005 | Riddle | ................ | A47J 36/24 99/483 |
| 2007/0151557 A1* | 7/2007 | McNelly | ................ | A47J 36/36 126/201 |
| 2013/0019763 A1* | 1/2013 | Scioscio | ................ | A47J 36/2405 99/483 |
| 2015/0108286 A1* | 4/2015 | Barnes | ................ | A47J 43/287 248/37.6 |
| 2016/0157676 A1* | 6/2016 | Difante | ................ | A47J 36/2405 126/33 |
| 2017/0196402 A1* | 7/2017 | Kearney | ................ | A47J 39/02 |

* cited by examiner

*Primary Examiner* — Steven M Marsh
(74) *Attorney, Agent, or Firm* — Georgiy L. Khayet

(57) ABSTRACT

Certain embodiments herein relate to a chafer skirt that comprises a band that may be removably attached to the perimeter of a chafer dish frame via a securing mechanism. The chafer skirt may further comprise a plurality of plates coupled to the band via a plurality of fasteners, where each of the plurality of plates further comprise an attachment mechanism, to individually attach each of the plates to the perimeter of the chafer dish frame, such that the band wraps around the chafing dish frame and the plurality of plates extend downward from the band to form a wall around one or more sides of the chafing dish frame, thereby enclosing a heat source below the chafing dish frame.

5 Claims, 2 Drawing Sheets

CHAFER SKIRT

FIELD OF THE DISCLOSURE

Embodiments of the disclosure generally relate to a chafer skirt, and more particularly, to a chafer skirt that provides uniform heat flow to food contents in a chafing dish.

BACKGROUND

Chafing dish assemblies have been in wide-spread use as a utensil for heating a variety of food products. As shown in FIG. 1, a conventional chafing dish assembly 100 typically includes a frame 110 and a portable heat source, such as, one or more STERNO® cans 120. In use, a dish or tray-like food container, such as chafing dish 130 may be placed into the frame 110 to support the chafing dish 130 above a support surface, such as a table or counter top, where the one or more STERNO® cans 120 provide heat to the food contents in the chafing dish 130. While conventional chafing dish assemblies may be useful in heating food items, there are limitations, including the inability to heat food being held in the chafing dish uniformly. This can cause the food to "dry out" or burn in some areas of the chafing dish, which affects the overall appeal of the food. Additionally, the heat sources associated with conventional chafing dish assemblies cannot be adjusted if the food being held in the chafing dish is too hot or cold.

SUMMARY

Some or all of the above needs and/or problems may be addressed by certain embodiments of the disclosure. According to one embodiment of the disclosure, there is disclosed a chafer skirt. The chafer skirt may include a band that may be attached to the perimeter of the frame of a chafing dish assembly via a securing mechanism. The chafer skirt may further include one or more plates cooperatively coupled to the band, wherein each of the one or more plates comprise a attachment mechanism to fixedly attached each of the one or more plates to the frame of the chafing dish assembly. In use, the band wraps around and is secured to the perimeter of the frame and the one or more plates extend downward from the band to form a wall around one or more sides of the frame of the chafing dish assembly, thereby enclosing a heat source associated with the chafer dish assembly. To this end, the chafer skirt may provide a more direct flow of heat from the heat source to the bottom of a chafing dish being held by the frame of the chafing dish assembly, as well as heat the food products within chafing dish uniformly and at a more consistent temperature. By substantially enclosing the heat source under the chafing dish with the chafing skirt, the heat retention below the chafing dish is significantly increased and food within the chafing dish is more uniformly heated.

In one embodiment, each of the one or more plates may slide along the length of the band and then individually secure around the perimeter of the chafing dish frame via the respective attachment mechanism in order to form an opening in the chafing skirt in order to adjust amount of heat being provided from the heat source to a chafing dish being held by a chafing dish frame, thereby exposing the heat source to the outside environment.

Other embodiments, aspects, and features of the disclosure will become apparent to those skilled in the art from the following detailed description, the accompanying drawings, and the appended claims.

BRIEF DESCRIPTION OF THE DRAWINGS

The detailed description is set forth with reference to the accompanying drawings, which are not necessarily drawn to scale. The use of the same reference numbers in different figures indicates similar or identical items.

DETAILED DESCRIPTION

Illustrative embodiments of the disclosure will now be described more fully hereinafter with reference to the accompanying drawings, in which some, but not all embodiments of the disclosure are shown. The disclosure may be embodied in many different forms and should not be construed as limited to the embodiments set forth herein; rather, these embodiments are provided so that this disclosure will satisfy applicable legal requirements.

Certain embodiments disclosed herein relate to a chafer skirt that surrounds and is removably secured to a chafer dish frame to keep heat retained under a chafer dish being held by the chafing dish frame. In some embodiments, the chafer skirt includes a band that is coupled to one or more plates. In one embodiment, each of the one or more plates may be individually attached to the band via a fastener such that each of the plates may slide along the length of band. In one embodiment, the one or more plates may be constructed from aluminum material, stainless steel material, gold plated material, and the like.

In certain embodiments, the band may be attached to along the frame of a chafing dish assembly via a securing mechanism to facilitate a relatively snug fit around a chafing dish frame, where the one or more plates extend downward from the band to form a wall around one or more sides of the chafing dish frame, thereby enclosing a heat source disposed under the chafing dish frame. In certain embodiments, the band and the plurality of plates is a fire resistant material.

Figure 1:
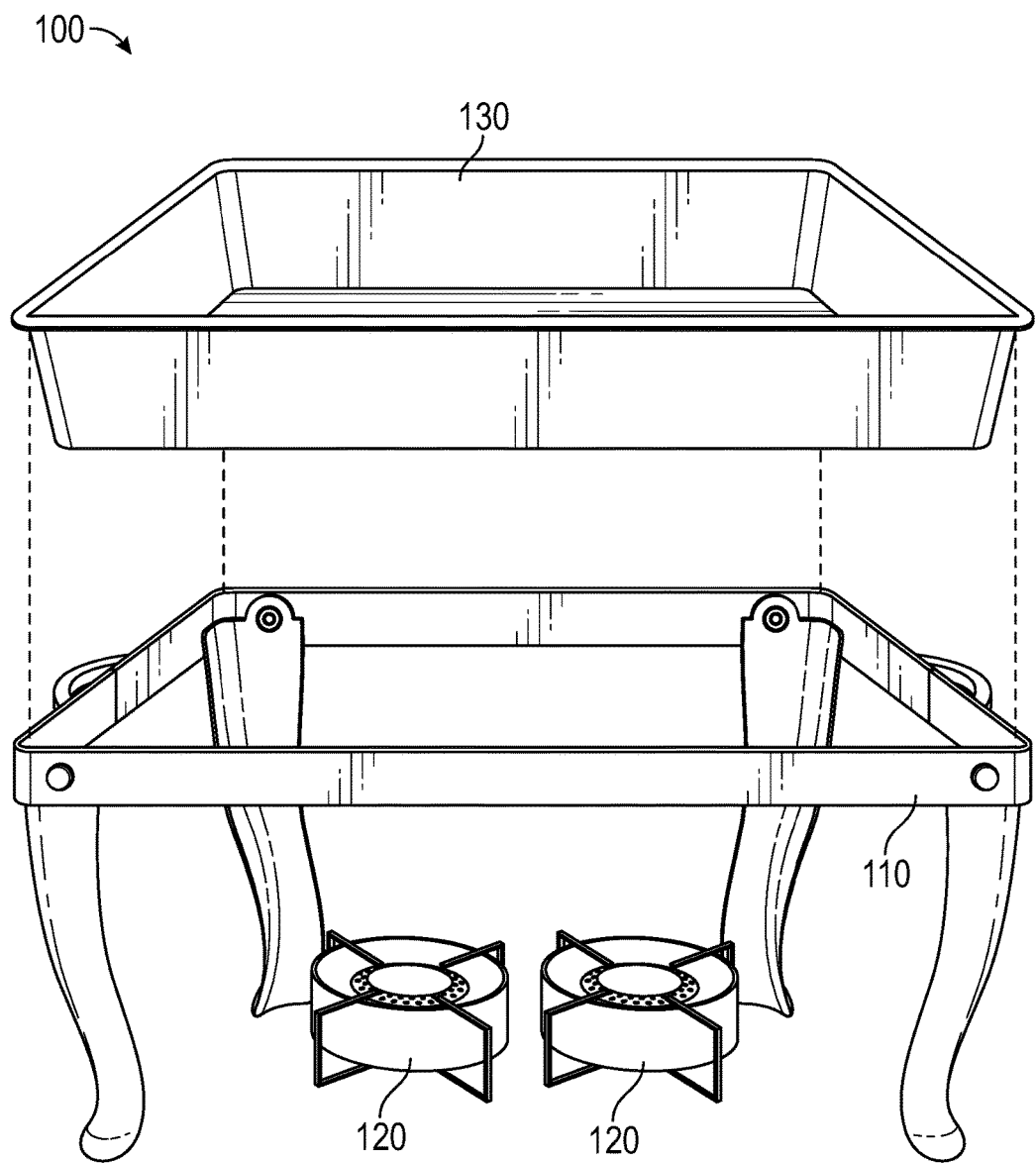
FIG. 1 illustrates a conventional chafer dish assembly.
Figure 2:
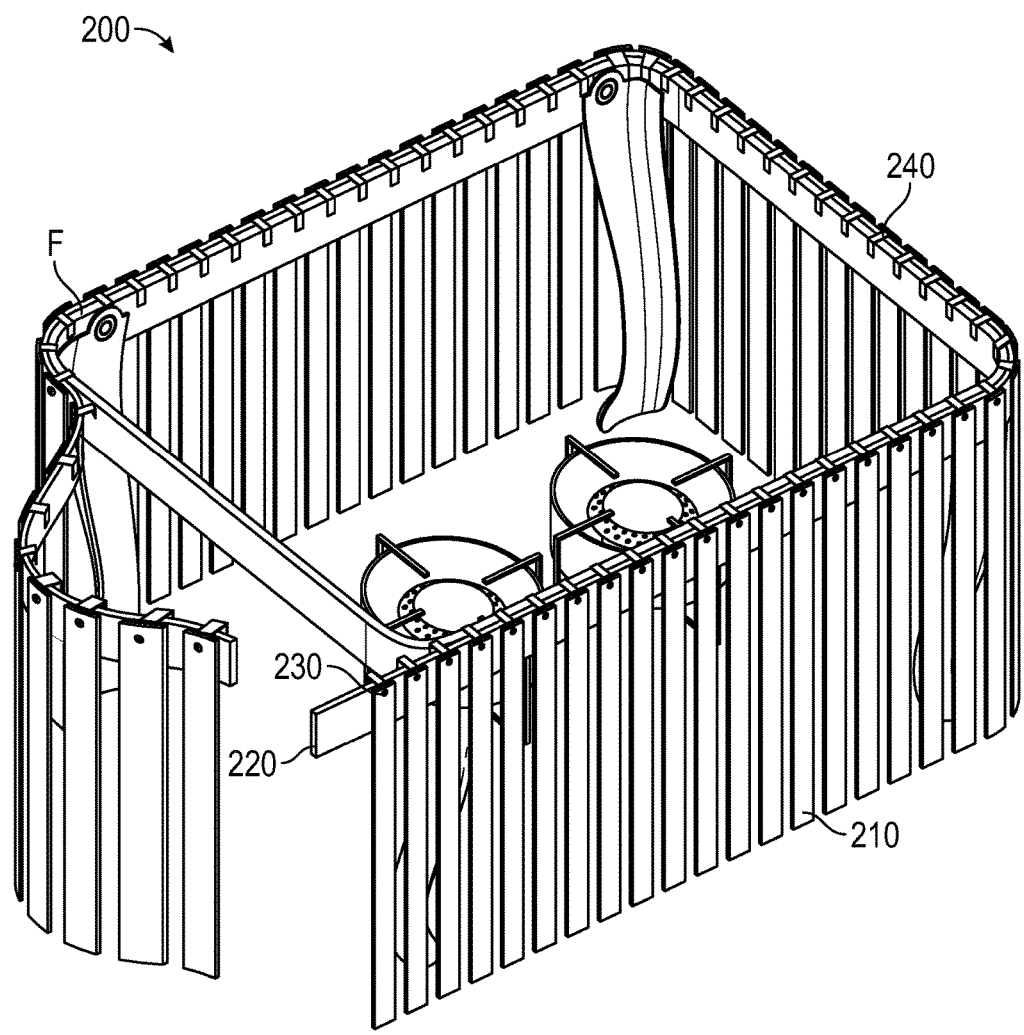
FIG. 2 illustrates an embodiment of the chafer skirt in use, according to an embodiment of the disclosure.

Referring now to FIG. 2, shown is a top view of chafing skirt 200 in use. As shown in FIG. 2, the chafing skirt 200 may comprise a band 220. The band 220 may be removably attached to the perimeter of a chafing dish frame F. In one embodiment, the band 220 may be secured to the chafing dish frame F via one or more securing mechanisms, such as, a buckle, a fastener, or any fastener know to one in ordinary skill in the art can be used. In one embodiment, the band 220 may be of a length that is long enough to accommodate chafing dish frames of variable size. Additionally, in one embodiment, the band 220 may comprise one or more magnetic fasteners, which may be used to magnetically fasten the band 220 along the perimeter of the chafing dish frame F.

With continued reference to FIG. 2, the band 220 may be cooperatively coupled to one or or more plates 210. In one embodiment, each of the one or more plates may be coupled to the band 220 via a fastener 230. Any fastener known to one of ordinary skill in the art can be used. These include, but are not limited to clasps, loops, latches, and the like. In certain embodiments, each of the one or more plates 210 may be configured to slide along the length of the band 220.

Additionally, in one embodiment, each of the one or more plates 210 may further comprise an attachment mechanism 240 such that each of the one or more plates 210 may be individually attached to chafing dish frame F via the attachment mechanism 240. As shown in FIG. 2, in use, the band 240 wraps around the chafing dish frame F and the one or more plates 210 extend downward from the band to form a wall around one or more sides of the chafing dish frame F, thereby enclosing the heat sources below the chafing dish frame F.

In certain embodiments, to adjust the amount of heat being provided to a dish placed being supported by the chafing dish frame F, a user may slide one or more of the plates 210 along the length of the band 220 and then secure the plates 210 to the chafing dish frame F, thereby forming an opening in the chafing skirt 200 and exposing the heat sources to the outside environment.

Additionally, in certain embodiments, the band 220 and the one or more plates 210 are a fire resistant material. In one embodiment, the one or more plates 210 may be an aluminum material, stainless steel material, and/or gold plated material.

Definitions

The following definitions are included to provide a clear and consistent understanding of the specification and claims. As used herein, the recited terms have the following meanings. All other terms and phrases used in this specification have their ordinary meanings as one of skill in the art would understand.

References in the specification to "one embodiment", "an embodiment", etc., indicate that the embodiment described may include a particular aspect, feature, structure, moiety, or characteristic, but not every embodiment necessarily includes that aspect, feature, structure, moiety, or characteristic. Moreover, such phrases may, but do not necessarily, refer to the same embodiment referred to in other portions of the specification. Further, when a particular aspect, feature, structure, moiety, or characteristic is described in connection with an embodiment, it is within the knowledge of one skilled in the art to affect or connect such aspect, feature, structure, moiety, or characteristic with other embodiments, whether or not explicitly described.

The singular forms "a," "an," and "the" include plural reference unless the context clearly dictates otherwise. Thus, for example, a reference to "a compound" includes a plurality of such compounds, so that a compound X includes a plurality of compounds X. It is further noted that the claims may be drafted to exclude any optional element. As such, this statement is intended to serve as antecedent basis for the use of exclusive terminology, such as "solely," "only," and the like, in connection with any element described herein, and/or the recitation of claim elements or use of "negative" limitations.

The term "and/or" means any one of the items, any combination of the items, or all of the items with which this term is associated. The phrase "one or more" is readily understood by one of skill in the art, particularly when read in context of its usage.

As used herein, the term "about" refers to an approximately +/−10% variation from a given value. It is to be understood that such a variation is always included in any given value provided herein, whether or not it is specifically referred to.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, for use in an explicit negative limitation.

The claimed invention is:

1. A chafing skirt, comprising:
   a band, wherein the band is removably attached to a perimeter of a chafing dish frame via a securing mechanism; and
   a plurality of plates coupled to the band via a plurality of fasteners, wherein each of the plurality of plates comprise an attachment mechanism to individually attach each of the plurality of plates to the chafing dish frame, and wherein the band wraps around the chafing dish frame and the plurality of plates extend downward from the band to form a wall around one or more sides of the chafing dish frame, thereby enclosing a heat source below the chafing dish frame.

2. The chafing skirt of claim 1, wherein each of the plurality of plates are configured to slide along a length of the band.

3. The chafing skirt of claim 1, wherein one or more of the plurality of plates may slide along the length of the band and individually attach to the chafing dish frame via the attachment mechanism in order to form an opening in the chafing skirt, wherein the opening adjusts the amount of heat being provided from the heat source to a bottom of a dish being supported by the chafing dish frame by exposing to heat source to an outside environment.

4. The chafing dish skirt of clam 1, wherein the plurality of plates is selected from the group consisting of aluminum material, stainless steel material, and gold plated material.

5. The chafing dish skirt of clam 1, wherein the band and the plurality of plates is a fire resistant material.

\* \* \* \* \*